United States Patent [19]

Cheatum

[11] 4,043,099
[45] Aug. 23, 1977

[54] AGRICULTURAL IMPLEMENT HYDRAULIC SYSTEM

[75] Inventor: Leo George Cheatum, Ottumwa, Iowa

[73] Assignee: Deere & Company, Moline, Ill.

[21] Appl. No.: 701,839

[22] Filed: July 1, 1976

[51] Int. Cl.² .............................................. A01D 75/22
[52] U.S. Cl. ..................................... 56/10.9; 56/11.9; 56/15.9; 56/228; 172/456
[58] Field of Search .................... 56/10.9, 11.9, 15.9, 56/218, 228, 341; 172/456, 311

[56] References Cited

U.S. PATENT DOCUMENTS 3,535,860  10/1970  Schwalm et al. ................ 56/11.9 X Primary Examiner—Jay N. Eskovitz

[57] ABSTRACT

A pull-type harvesting machine in the form of a baler has a vertically adjustable windrow pickup mechanism and a generally fore-and-aft laterally swingable tongue that connects the baler to a towing tractor, lateral adjustment of the tongue causing the baler to shift between a transport position behind the tractor and an operating position wherein the pickup mechanism is disposed outwardly of the tractor. The positions of the tongue and the header are respectively controlled by a pair of two-way hydraulic cylinders, and the flow of pressurized fluid between the cylinders and the tractor hydraulic system is controlled by a single control valve on the tractor, the cylinders being connected in parallel. A pair of solenoid-actuated valves are disposed in the hydraulic lines on the opposite sides of the cylinder that controls the tongue, the solenoid valves being powered by the tractor electrical system and controlled by a switch on the tractor so that the operator can selectively lock out the tongue control cylinder, whereby the pickup mechanism and the tongue can simultaneously be adjusted from their transport to their operating condition or the pickup mechanism can be vertically adjusted independent of the tongue.

9 Claims, 2 Drawing Figures

AGRICULTURAL IMPLEMENT HYDRAULIC SYSTEM

BACKGROUND OF THE INVENTION

This invention relates to the control system for controlling a number of hydraulic functions on a agricultural machine towed by a tractor, the hydraulic functions being connected to the tractor hydraulic system and controlled by the tractor operator from the tractor.

Many pull-type or towed farm implements have a number of hydraulic motors or cylinders that control various functions on the implement, the hydraulic motors being connected by suitable conduits to hydraulic outlets on the tractor. For example, a pull-type baler is conventionally towed by a tractor and powered by the tractor power take-off system and includes a vertically adjustable header or pickup in addition to a swingable tongue, that is shiftable to position the baler behind the tractor for transport or into a field operating position, wherein the pickup is disposed outwardly of the tractor. Normally some means are provided for raising the pickup during transport of the machine or to clear obstacles in the field, and it is known to utilize a hydraulic cylinder so that the pickup can be raised via the cylinder without the operator leaving the tractor. Similarly, it is known to provide a hydraulic cylinder for controlling the position of the tongue so that the baler can be swung between its field and operating positions without the operator leaving the tractor seat.

Other agricultural machines such as mower conditioners have utilized separate hydraulic cylinders for raising the implement header and swinging the implement between transport and operating positions.

Most modern tractors used in agricultural field work have hydraulic systems that include at least one pair of hydraulic outlets on the rear of the tractor into which hydraulic lines on a towed implement can be plugged, a control valve conventionally being provided for each pair of outlets to control the flow of pressurized fluid to and from the hydraulic motor on the implement. Releasable couplings, such as shown in U.S. Pat. No. 3,140,102, are conventionally provided for connecting the implement hydraulic lines into the tractor outlets.

While most modern tractors, particularly the larger ones, are provided with up to three sets of outlets for controlling three separate hydraulic functions on the implement, many older or smaller tractors are provided with only one pair of outlets and are thus able to operate only one hydraulic function on the implement. Machines such as balers, as illustrated herein, or mower conditioners require less power than some of the other agricultural implements or tools, and are frequently operated by older or smaller tractors having only one pair of outlets, creating a problem if the implement has multiple hydraulic functions.

It is known in balers to provide mechanisms interconnecting their implement tongue and the pickup so that a single hydraulic cylinder can be utilized to raise the pickup and swing the tongue, although such devices are obviously more expensive and complicated than use of separate hydraulic cylinders.

SUMMARY OF THE INVENTION

According to the present invention, there is provided an improved system for controlling a pair of hydraulic cylinders for separate functions on a trailing implement from a tractor having a single pair of outlets. More specifically, a pair of hydraulic motors on the implement are connected in parallel to the single pair of outlets on the tractor and a second control valve means is mounted on the implement in the lines to one of the motors, the second control valve being selectively actuated from the tractor to selectively lock out the second motor, so that actuation of the main control valve on the tractor operates either the first implement motor alone or both of the motors in unison.

An important feature of the invention is the utilization of a pair of valves in the lines leading to and from the second motor so that the flow fluid is checked from the motor in either direction when the valves are closed. Still another feature of the invention resides in providing solenoid valves for said second valve means so that the valves can be easily controlled from the tractor by a simple electric circuit. Another feature of the invention resides in the fact that such valves are relatively inexpensive and readily available commercially.

A more specific aspect of the invention resides in the use of the system on a baler or the like having a vertically adjustable header or pickup that is raised by a first hydraulic cylinder and a swingable tongue that is controlled by a second cylinder so that when second valve means associated with the second cylinder is closed, actuation of the main control valve on the tractor raises and lowers the header only, while when the second valve means is open, actuation of the main control valve on the tractor will cause the header to raise while the implement tongue is shifted. Thus, whenever the tongue control cylinder is actuated to move the tongue to its transport position, the header must necessarily be raised.

Another important feature of the invention resides in the simple and inexpensive construction of this system.

DESCRIPTION OF THE PREFERRED EMBODIMENT

Figure 1:
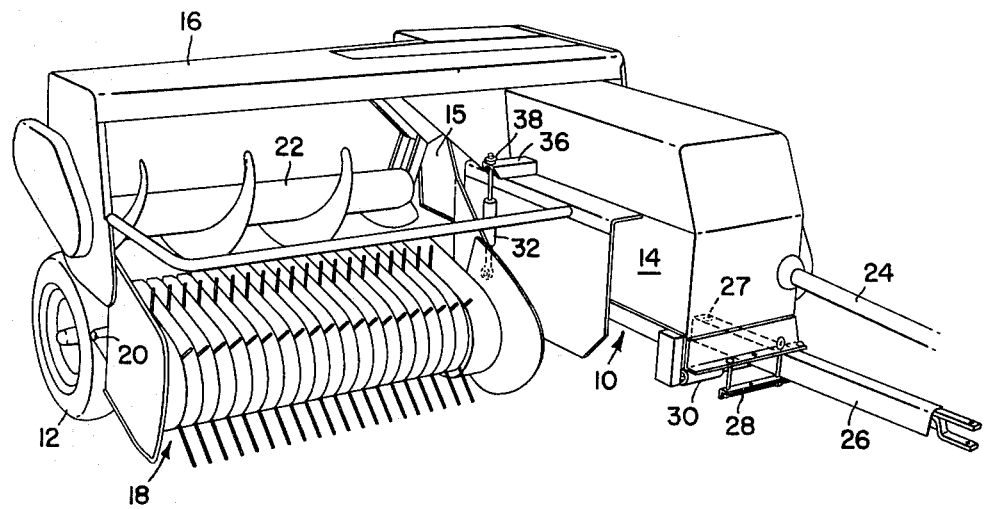
FIG. 1 is a front perspective view of a pull-type baler embodying the invention with the baler pickup and the baler tongue shown in operating position.
Figure 2:
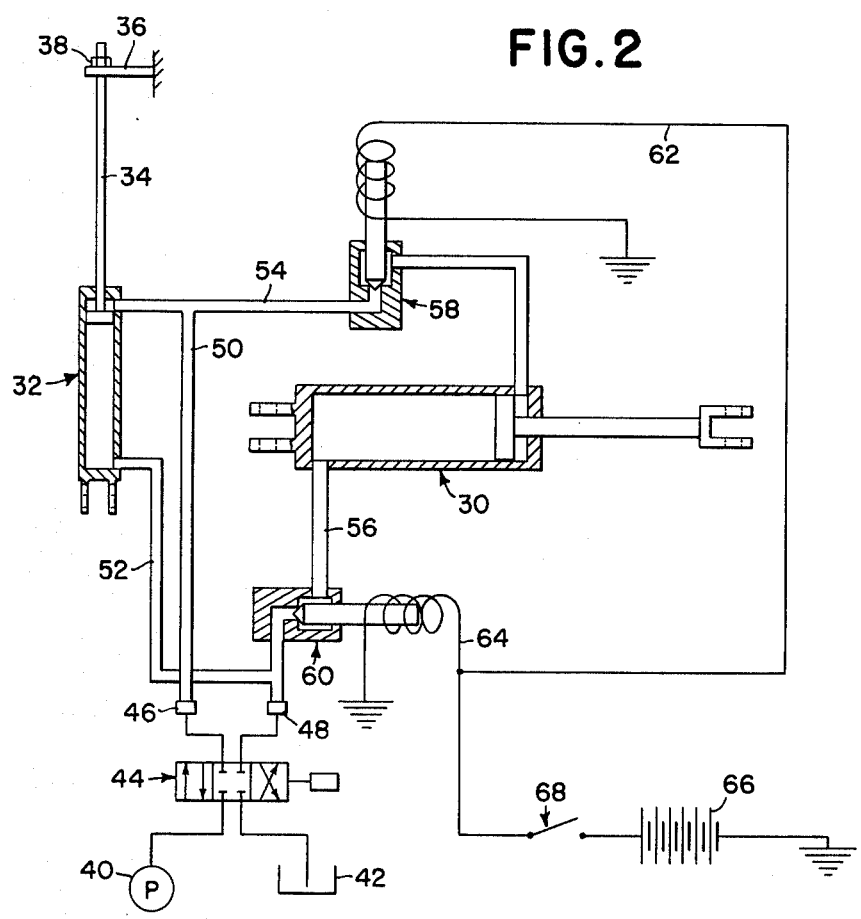
FIG. 2 is a schematic view of the hydraulic system for controlling the baler tongue and the pickup.

The invention is embodied in a pull-type agricultural baler having an L-shaped main frame, indicated in its entirety by the numeral 10. The main frame is mounted on a pair of rearward wheels 12, only the right wheel being shown in the drawings. Extending in a fore and aft direction on the left side of the baler is a bale case 14 having a lateral opening 15 adjacent its rearward end. A transverse hooded portion 16 extends laterally from the rear end of the bale case to form the L-shaped frame in conjunction with the bale case. A transversely elongated pickup mechanism or header 18 is disposed forwardly of the transverse portion 16 and is connected thereto by a transverse pivot 20, so that the pickup mechanism or header 18 is vertically adjustable about the pivot 20. A transverse feeder auger 22 is mounted on the transverse rear portion 16 immediately behind the pickup mechanism and is operative to receive crop material from the pickup mechanism and feed it through the feed opening 15 into the bale case 14, where the crop material is compacted into a rectangular bale. All the above represents more or less conventional baler construction.

The driven components of the baler, such as the auger, the pickup mechanism, and the baling mechanism, are driven from the tractor PTO through a drive shaft 24, only a portion of which is shown, conventional drive means being utilized to drive the various driven components from the drive shaft. Extending forwardly from the fore and aft portion of the main frame 10 on the underside of the bale case 14 is a generally fore and aft tongue 26, the forward end of which is connectible to a tractor drawbar (not shown), while the rearward end is connected to the baler frame by a vertical pivot 27. The tongue 26 is swingable in a horizontal arc about the pivot 27 between a transport position, wherein the baler is disposed generally behind the tractor, and an operating position, wherein it locates the baler so that the pickup mechanism is outboard of the tractor wheels. A locking device 28 can be provided to lock the tongue in its alternate positions, although the locking device would not be used when the position of the baler is being controlled from the tractor.

The position of the tongue, or the swinging of the tongue between its alternate position, is controlled by a hydraulic cylinder 30 having one end connected to the tongue forwardly of the pivot 27 and its other end connected to the forward end of the frame 10 below the forward end of the bale case, the cylinder 30 being extended when the tongue is in its operating position as shown in FIG. 1, and retracted when the tongue is positioned for transport of the baler. Similarly, the vertical position of the pickup mechanism 18 is controlled by a hydraulic cylinder 32. The cylinder is disposed at the left end of the pickup mechanism 18 and has its lower or cylinder end connected to the pickup mechanism. The cylinder 32 includes a piston rod 34 that extends upwardly from the cylinder through an opening in a bracket 36 attached to the side of the bale case 14, a nut 38 being threaded on the upper threaded end of the piston rod 34 and being engageable with the top of the bracket 36. When the cylinder 32 is fully extended, as shown in the drawings, and the nut 38 engages the top of the bracket 36, the cylinder acts to limit the downward position of the pickup mechanism, and, as is apparent, adjustment of the nut 38 provides an adjustment of the operating height of the pickup. The pickup is free to swing upwardly should the pickup engage an obstruction in the field, in which case the piston rod moves upwardly through the hole in the bracket 36, the nut disengaging the top of the bracket. Thus, the connection between the upper end of the cylinder 32 and the bracket 36 that is attached to the main frame provides a lost motion connection that permits the pickup mechanism to swing upwardly independently of the cylinder.

The tractor hydraulic system includes a pump 40, an associated reservoir 42, and a manually actuated control valve 44 that controls the flow of pressurized fluid from the pump to a pair of hydraulic outlets or couplings 46 and 48, the control valve being a three-position valve operative to connect either of the outlets to the pump while the other is connected to the reservoir, or to block fluid flow to and from the outlets. Some such valves also include a float position wherein both of the outlets are connected to the reservoir. The outlets or couplings 46 are conventionally disposed on the rear of the tractor and the control valve 44 is conventionally actuated by the operator from the tractor operator's seat.

The control system includes hydraulic conduits or lines 50 and 52 respectively connected to the outlets 46 and 48 through releasable couplings, which are not shown in detail since such couplings are well known. The conduit 50 is connected to the upper or rod end of the cylinder 32, while the conduit 52 is connected to the lower or cylinder end of the cylinder 32. A third conduit 54 connects the conduit 50 to the rod end of the cylinder 30, while a fourth conduit 56 connects the conduit 52 to the opposite or cylinder end of the cylinder 30. A solenoid actuated valve 58 is disposed in the conduit 54 between the cylinder 30 and the conduit 50, and a similar solenoid actuated valve 60 is disposed in the conduit 56 between the cylinder 30 and the conduit 52. As is apparent, the valves 58 and 60 open to admit the flow of fluid into the respective ends of the cylinder 30, and when the valves 58 and 60 are unactuated or closed, they block the flow of fluid from either end of the cylinder 30. The solenoid valves 58 and 60 are connected in parallel by electric leads 62 and 64 which are connected to a source of electric power, such as the tractor battery, through a switch 68, preferably disposed at the operator's station on the tractor.

When the baler is being operated in the field, the tongue cylinder 30 is extended and the header or pickup mechanism cylinder 32 is also extended, as shown in the drawings. Normally the switch 68 would be open during operation of the machine, so that the valves 58 and 60 are unactuated to block the flow of fluid from the cylinder 30, blocking the tongue in its operating position. Similarly, the valve 44 would be in its neutral position as shown. If the operator desires to raise the pickup mechanism to clear an obstruction, he would simply actuate the control valve 44 to pressurize the conduit 50, while connecting the conduit 52 to the reservoir, so that the cylinder 32 retracts and raises the pickup mechanism. The pickup can be lowered by shifting the valve 44 in the opposite direction to extend the cylinder 32.

If the operator desires to swing the tongue 26 from its operating to its transport position, the operator would close the switch 68 to open the solenoid valves 58 and 60, so that in effect the cylinders 30 and 32 are connected in parallel. Actuation of the control valve 44 will then retract both cylinders 30 and 32 to raise the pickup mechanism and swing the tongue to its transport position. The tongue can again be locked in the transport position by opening the switch 68 so that the cylinder 30 is again hydraulically locked. This is done principally by the solenoid valve 58, which prevents the escape of fluid from the rod end of the cylinder and thereby prevents extension of the cylinder. Of course, the tongue can be repositioned in its operating condition by shifting the valve 44 in the opposite direction to pressurize the conduit 56 after the switch 68 is closed to open the valves 58 and 60. Again, opening of the switch 68 after the cylinder 30 is fully extended will cause the valve 60 to block the flow of fluid from the cylinder end of the cylinder 30, locking the cylinder in its extended position.

I claim:

1. In an agricultural machine having a mobile main frame connected to and towed by a tractor having a fluid pressure source, a reservoir and a first control valve means having first and second outlets and operative to control the flow of pressurized fluid between said outlets and the fluid pressure source and the reservoir, the machine having first and second shiftable elements and first and second hydraulic motor means respectively operative to control the position of said elements, the combination therewith of improved connecting means for connecting said motor means to the outlets comprising: a first hydraulic conduit means including first and second conduits respectively connecting the opposite ends of the first motor means to the first and second outlets respectively; a second hydraulic conduit means including third and fourth conduits respectively connecting the first and second conduits to the opposite sides of the second motor means so that the motor means are connectible in parallel to the outlets; a second control valve means disposed in the second conduit means and shiftable between alternate conditions to control the flow of fluid between the first conduit means and the second motor means; and control means actuatable from the tractor and operatively connected to the second control valve means for controlling the condition of the second control valve means.

2. The invention defined in claim 1 wherein the second control valve means comprises a pair of selectively closeable valves respectively disposed in the third and fourth conduits.

3. The invention defined in claim 2 wherein the tractor includes an electric power source and said second control valve means comprise solenoid actuated valves and the control means includes a switch mounted on the tractor and selectively actuatable to connect the electric power source to the solenoid actuated valves.

4. The invention defined in claim 1 wherein the machine includes a forwardly extending laterally shiftable tongue connected to the tractor and the second motor means comprises a hydraulic cylinder operative between the tongue and the frame to shift the tongue between operating and transport positions, the second control valve means being operative to hydraulically block the flow of fluid from the hydraulic cylinder to lock the tongue in either of said positions.

5. The invention defined in claim 1 wherein the machine includes a vertically adjustable header and the first motor means includes a hydraulic cylinder operatively interconnecting the header to the frame to control the vertical position of the header.

6. The invention defined in claim 5 and wherein the first motor means includes a lost motion mechanism between the header and the frame operative to permit the header to swing upwardly relative to the main frame when the first control valve means is in a closed condition.

7. The invention defined in claim 5 wherein the machine includes a forwardly extending laterally shiftable tongue connected to the tractor and the second motor means comprises a hydraulic cylinder operative between the tongue and the frame to shift the tongue between operating and transport positions, the second control valve means being operative to hydraulically block the flow of fluid from the hydraulic cylinder to lock the tongue in either of said positions.

8. The invention defined in claim 7 wherein the second control valve means comprises a pair of selectively closable valves respectively disposed in the third and fourth conduits.

9. The invention defined in claim 8 wherein the tractor includes an electric power source and said second control valve means comprises solenoid actuated valves and the control means includes a switch mounted on the tractor and selectively actuable to connect the electric power source to the solenoid actuated valves.

* * * * *